United States Patent
Lee et al.

(10) Patent No.: US 9,234,781 B2
(45) Date of Patent: Jan. 12, 2016

(54) AUTOMATIC FILLING UP SPUIT

(71) Applicants: Young Ju Lee, Anyang-si (KR); Jae Kwang Hwang, Seoul (KR)

(72) Inventors: Young Ju Lee, Anyang-si (KR); Jae Kwang Hwang, Seoul (KR)

(*) Notice: Subject to any disclaimer, the term of this patent is extended or adjusted under 35 U.S.C. 154(b) by 226 days.

(21) Appl. No.: 13/912,869

(22) Filed: Jun. 7, 2013

(65) Prior Publication Data
US 2014/0361047 A1    Dec. 11, 2014

(51) Int. Cl.
*B65D 83/00* (2006.01)
*G01F 11/02* (2006.01)
*B65D 41/56* (2006.01)

(52) U.S. Cl.
CPC .............. *G01F 11/028* (2013.01); *B65D 41/56* (2013.01)

(58) Field of Classification Search
CPC ........ A45D 40/26; B05B 11/309; B65B 1/04; B65D 47/00; B65D 5/66; B65D 83/0022
USPC .............. 141/22, 23, 24, 90; 222/145.5, 320, 222/321.1, 336, 342, 372, 630, 631
See application file for complete search history.

(56) References Cited

U.S. PATENT DOCUMENTS

| | | | | |
|---|---|---|---|---|
| 2,781,063 A * | 2/1957 | Williams | ........................ | 141/24 |
| 3,101,751 A * | 8/1963 | Ballin | .............................. | 141/24 |
| 3,820,576 A * | 6/1974 | Torrent | .......................... | 141/24 |
| 4,278,360 A * | 7/1981 | Lorscheid et al. | ............ | 401/151 |
| 4,376,591 A * | 3/1983 | Proffer | .......................... | 401/127 |
| 4,579,153 A * | 4/1986 | Goncalves | ....................... | 141/23 |
| 5,226,572 A * | 7/1993 | Gargione | ..................... | 222/214 |
| 6,112,779 A * | 9/2000 | Camilla | .......................... | 141/23 |
| 2004/0159677 A1* | 8/2004 | Hwang | ....................... | 222/145.5 |
| 2011/0284123 A1* | 11/2011 | Bouix et al. | .................... | 141/23 |
| 2013/0074983 A1* | 3/2013 | Choi | ................................. | 141/23 |
| 2013/0112314 A1* | 5/2013 | Lee et al. | ......................... | 141/23 |
| 2013/0192713 A1* | 8/2013 | Drugeon et al. | ................ | 141/26 |
| 2014/0234007 A1* | 8/2014 | Lee | ................................. | 401/121 |
| 2014/0361047 A1* | 12/2014 | Lee et al. | ....................... | 222/372 |

\* cited by examiner

*Primary Examiner* — Jason K Niesz
*Assistant Examiner* — Andrew Schmid
(74) *Attorney, Agent, or Firm* — Hauptman Ham, LLP

(57) ABSTRACT

An automatic filling up spuit (100) screwed to an entrance (1a) of a cosmetics container (1) for suctioning and discharging liquid stored in the cosmetics container (1) includes: a spuit pipe (10); a cylinder member (20); a piston member (30); a cylindrical push button (50); and a top/bottom-opened cylindrical enclosure (60). The automatic filling up spuit has an advantage of convenient use in that it is capable of automatically filling up liquid contents in a cosmetics container by a certain amount precisely at all times through joining with the cosmetics container without requiring a separate filling up operation.

3 Claims, 3 Drawing Sheets

AUTOMATIC FILLING UP SPUIT

BACKGROUND OF THE INVENTION

1. Field of the Invention

The present invention relates to an automatic filling up spuit, and more particularly, to an automatic filling up spuit with a simple structure, which is capable of automatically filling up liquid contents in a cosmetics container by a certain amount precisely at all times through joining with the cosmetics container without requiring a complicated operation.

2. Description of the Related Art

In general, as one of methods of using liquid contents such as eye creams, cosmetics and the like desirable of use of the required small quantity at one time, there has been conventionally used a method of packing liquid contents individually in the form of a capsule or the like containing a desired quantity of liquid contents for each use. However, such an individual packing method has a problem of inefficiency since a relatively large quantity of contents is still left even when a user considers the contents to be used up.

To overcome such a problem of the individual packing method, there has been devised a structure in which contents stored in a container are drawn out for each use by using a drawing means having a traditional spuit, syringe or push pump structure or the like.

However, for the spuit-structured drawing means, since the amount of suction or drawing of the contents is varied depending on an amount by which a user presses a rubber pressing part, it may be impossible or nearly impossible to draw out the contents precisely by a certain quantity for each use.

In addition, for the syringe-structured drawing means, considering that an extremely small quantity (for example, about 1 ml) of contents is mostly used, there is a configuration trouble in that the diameter of a syringe or a stroke of a syringe piston has to be made very small. Further, there is a demerit of very troublesome use since the syringe piston has to be pulled to suction the contents and then be pushed to draw out the contents.

On the other hand, for the push pump-structured drawing means, although it has a merit that a certain amount of contents can be drawn out if only a button is simply pushed, there is a demerit of complicated structure in that it includes a button, a discharge port, a spring, a valve structure and so on as well as a structure forming the interior and exterior of the pump. In addition, it is common to use a suction tube to suction the contents on the characteristics of the push pump mainly installed in the upper portion of the container. However, in this case, there may be an impossibility of drawing-out of the contents left in the container depending on a position of the suction tube.

SUMMARY OF THE INVENTION

Accordingly, it is an object of the present invention to provide an automatic filling up spuit with a simple structure, which is capable of automatically filling up liquid contents in a cosmetics container by a certain amount precisely at all times through joining with the cosmetics container without requiring a complicated operation.

To achieve the above object, according to an aspect of the invention, there is provided an automatic filling up spuit (100) screwed to an entrance (1a) of a cosmetics container (1) for suctioning and discharging liquid stored in the cosmetics container (1), comprising a spuit pipe (10) serving as a passage for suction and discharge of liquid stored in the cosmetics container (1); a cylinder member (20) combined to the top inner circumference of the spuit pipe (10); a piston member (30) configured to fill the cylinder member (20) with cosmetics liquid via the spuit pipe (10) while ascending with rising of the cylinder member (20); a top/bottom-opened cylindrical piston guide member (40) which is inserted in the outer circumference of the piston member (30), with a vertical groove (41) formed on the inner circumference of the piston guide member (40) and inserted with a horizontal bar (34) of the piston member (30), for guiding the vertical movement of the piston member (30); a cylindrical push button (50) which discharges cosmetics solution filled in the cylinder (21) via the spuit pipe (10) while the piston member (30) is being descended by pushing the push button (50), with an insertion projection (51) formed on a bottom-opened ceiling and inserted in the outer circumference of a circular projection (35) projecting to the upper center of the horizontal plane (32) of the piston member (30); and a top/bottom-opened cylindrical enclosure (60) which encloses the outer circumference of the cylindrical push button (50) and the piston guide member (40).

Preferably, the cylinder member (20) includes: an inner cylinder (21) combined to the top inner circumference of the spuit pipe (10); a bottom-opened cylindrical portion (23) formed downward around a horizontal plane (22) formed on the middle outer circumference of the cylinder (21), with an inclined groove (24) symmetrically formed on the outer circumference of the cylindrical portion (23; and a screw combining portion (25) formed on the inner circumference of the cylindrical portion (23) and screwed to the entrance (1a) of the cosmetics container (1).

Preferably, the piston member (30) includes: a bar-like piston (31) provided with a cylindrical packing (31a) on the bottom outer circumference inserted from top in the inner circumference of the cylinder (21); two vertical guides (33) projecting downward around a horizontal plane (32) formed on the top of the piston (31); and a horizontal bar (34) projecting outward from the bottom of the vertical guides (33).

The automatic filling up spuit of the present invention has an advantage of convenient use in that it is capable of automatically filling up liquid contents in a cosmetics container by a certain amount precisely at all times through joining with the cosmetics container without requiring a separate filling up operation.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, an exemplary embodiment of the present invention will be described in detail with reference to the accompanying drawings. In the following detailed description of the present invention, concrete description on related functions or constructions will be omitted if it is deemed that the functions and/or constructions may unnecessarily obscure the gist of the present invention.

EMBODIMENT

Figure 1:
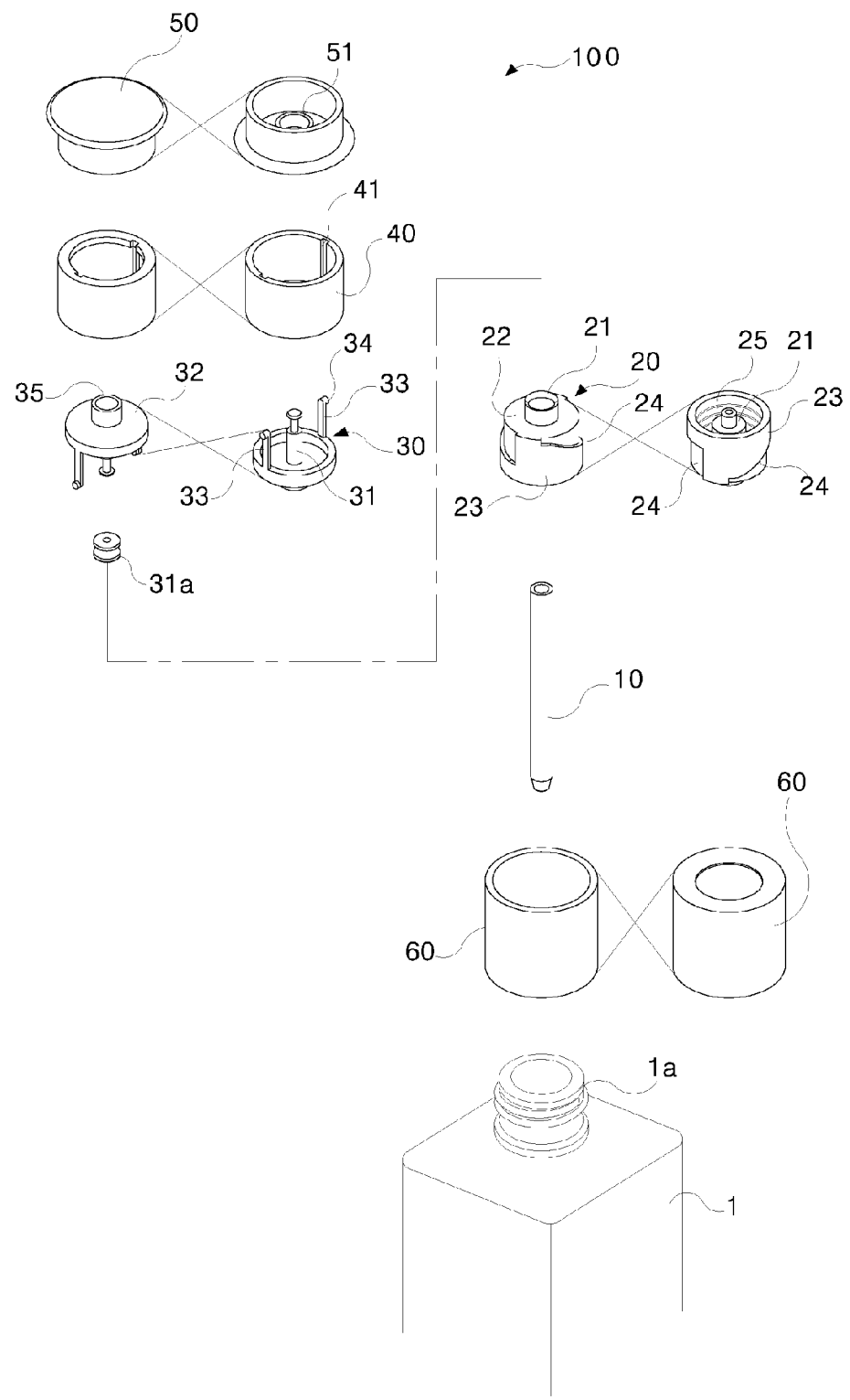
FIG. 1 is an exploded perspective view showing an automatic filling up spuit according to an embodiment of the present invention.
Figure 2:
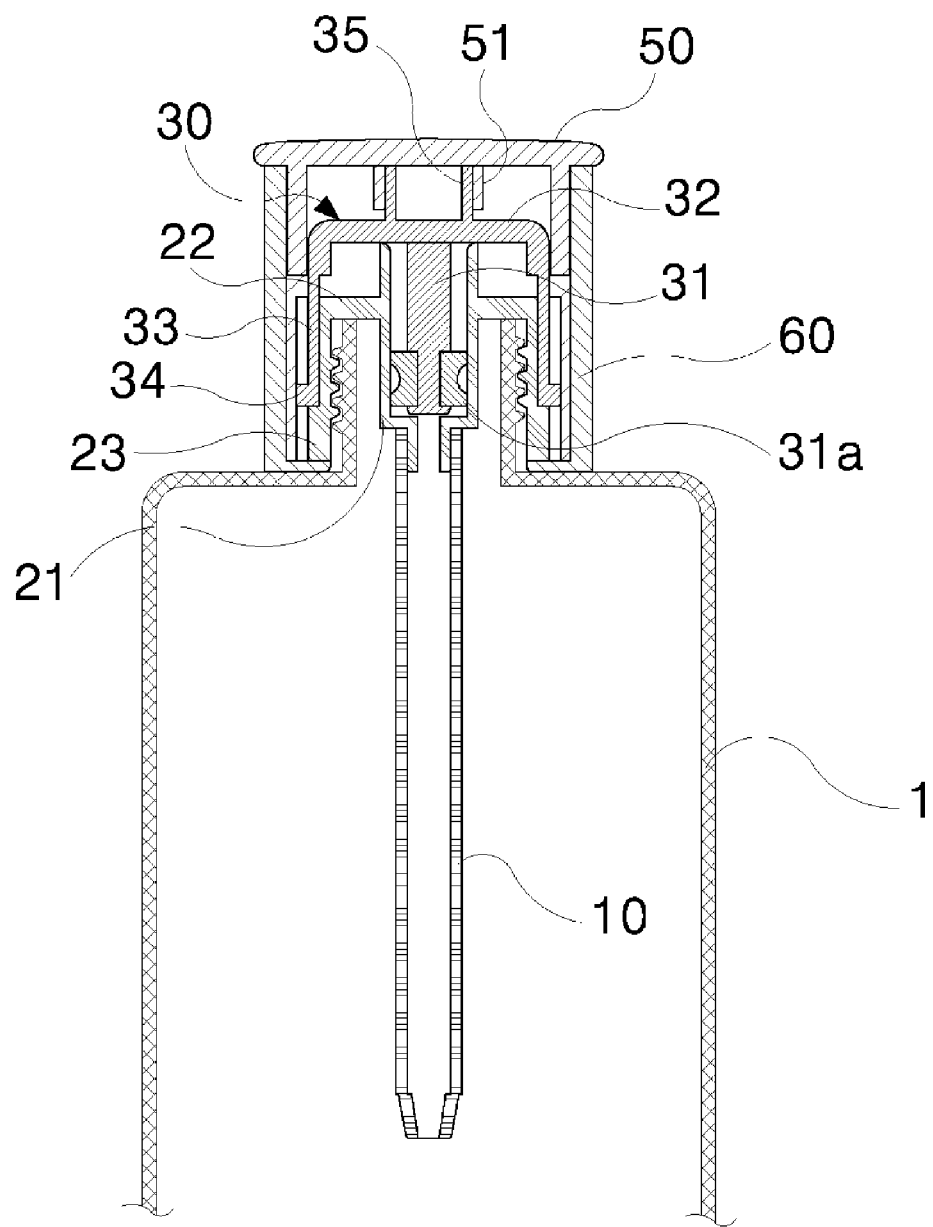
FIG. 2 is an assembled sectional view showing a state where liquid is discharged into the automatic filling up spuit according to the embodiment of the present invention.
Figure 3:
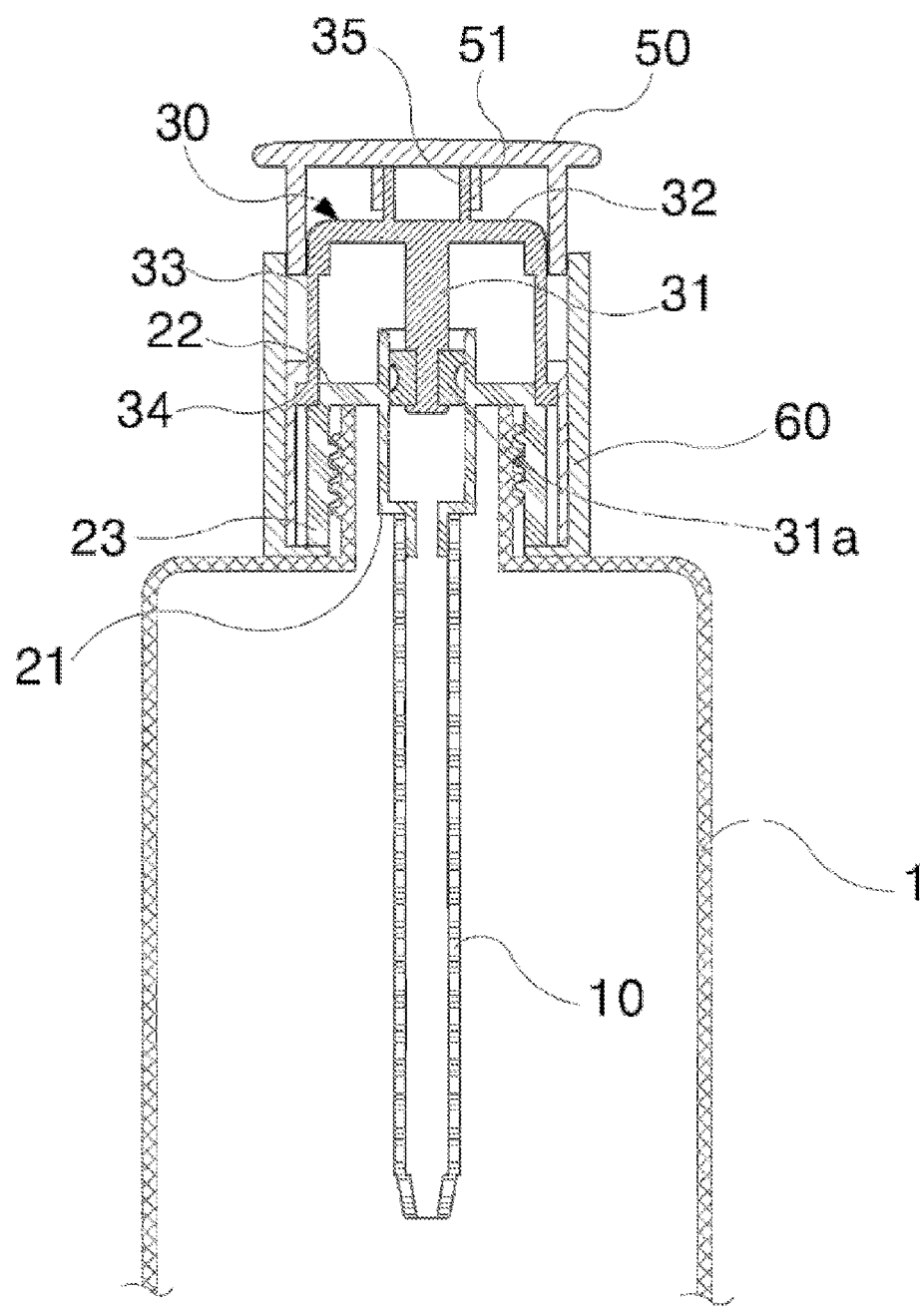
FIG. 3 is an assembled sectional view showing a state where the automatic filling up spuit according to the embodiment of the present invention is filled with liquid.

FIG. 1 is an exploded perspective view showing an automatic filling up spuit according to an embodiment of the present invention, FIG. 2 is an assembled sectional view showing a state where liquid is discharged into the automatic filling up spuit according to the embodiment of the present invention, and FIG. 3 is an assembled sectional view showing a state where the automatic filling up spuit according to the embodiment of the present invention is filled with liquid.

As shown in FIGS. 1 to 3, an automatic filling up spuit 100 screwed to an entrance 1a of a cosmetics container 1 for suctioning and discharging liquid stored in the cosmetics container 1 includes a spuit pipe 10 serving as a passage for suction and discharge of liquid stored in the cosmetics container; a cylinder member 20 which includes an inner cylinder 21 combined to the top inner circumference of the spuit pipe 10, a bottom-opened cylindrical portion 23 formed downward around a horizontal plane 22 formed on the middle outer circumference of the cylinder 21, with an inclined groove 24 symmetrically formed on the outer circumference of the cylindrical portion 23, and a screw combining portion 25 formed on the inner circumference of the cylindrical portion 23 and screwed to the entrance 1a of the cosmetics container 1; a piston member 30 which includes a bar-like piston 31 provided with a cylindrical packing 31a on the bottom outer circumference inserted from top in the inner circumference of the cylinder 21, two vertical guides 33 projecting downward around a horizontal plane 32 formed on the top of the piston 31, and a horizontal bar 34 projecting outward from the bottom of the vertical guides 33; a top/bottom-opened cylindrical piston guide member 40 which is inserted in the outer circumference of the piston member 30, with a vertical groove 41 formed on the inner circumference of the piston guide member 40 and inserted with the horizontal bar 34 of the piston member 30, for guiding the vertical movement of the piston member 30; a cylindrical push button 50 which discharges cosmetics solution filled in the cylinder 21 via the spuit pipe 10 while the piston member 30 is being descended by pushing the push button 50, with an insertion projection 51 formed on a bottom-opened ceiling and inserted in the outer circumference of a circular projection 35 projecting to the upper center of the horizontal plane 32 of the piston member 30; and a top/bottom-opened cylindrical enclosure 60 which encloses the outer circumference of the cylindrical push button 50 and the piston guide member 40.

Next, operation and effects of the automatic filling up spuit as configured above will be described.

An assembling procedure of the automatic filling up spuit 100 will be first described. First, the piston 31 assembled with the cylindrical packing 31a is inserted in the inner circumference of the cylinder 21, and the cylindrical piston guide member 40 is assembled through the lower side of the outer circumference of the piston member 30 such that the horizontal bar 34 projecting to the bottom outer side of the vertical guides 33 of the piston member 30 is inserted in the vertical groove 41.

Next, the cylindrical enclosure 60 is inserted in and combined to the outer circumference of the piston guide member 40 from below. Thereafter, the insertion projection 51 is inserted in the outer circumference of the circular projection 35 of the piston member 30 and the spuit pipe 10 is assembled to the bottom of the cylinder 21 of the cylinder member 20 to complete the assembly of the automatic filling up spuit 100.

In the assembled automatic filling up spuit 100, the screw combining portion 25 of the cylinder member 20 is screwed to the cosmetics container 1. As shown in FIG. 3, with the outer circumference of the cylindrical enclosure 60 grasped by one hand of a user, when the screw combining portion 25 is screwed to the cosmetics container 1 storing the liquid and the container 1 continues to be turned in a screw combination direction, the horizontal bar 34 of the piston member 30 lying on the inclined groove 24 formed on the outer circumference of the cylindrical portion 23 is ascended along an inclined plane while the screwed cylinder member 20 continues to be rotated. When the horizontal bar 34 is ascended, the liquid in the cosmetics container 1 is filled in the inner space of the cylinder 21 through the spuit pipe 10 while the cylindrical packing 31a adhered to the inner circumference of the cylinder 21 is being ascended along the piston 31.

In this manner, with the cosmetics liquid filled in the inner space of the cylinder 21, as shown in FIG. 3, for the purpose of using the cosmetics, the combined screw is released to separate the automatic filling up spuit 100 from the cosmetics container 1. That is, when the push button 50 is little by little pushed by a thumb, with the cylindrical enclosure gasped by a palm, the liquid filled in the inner space of the cylinder 21 is discharged via the spuit pipe 10 while the piston member 30 combined to the bottom of the push button 50 is being descended.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:
1. An automatic filling up spuit configured to be screwed to an entrance of a container for suctioning and discharging liquid stored in the container, the spuit comprising:
   a spuit pipe configured to serve as a passage for suction and discharge of the liquid stored in the container;
   a cylinder member connected to a top inner circumference of the spuit pipe;
   a piston member including
      a horizontal member,
      a bar-shaped piston extending downward from a center of the horizontal member and inserted within an interior of the cylinder member,
      a cylindrical packing on an outer circumference of a bottom part of the bar-shaped piston,
      at least one vertical guide extending downward from the horizontal member, and
      a circular projection extending upward from the center of the horizontal member;
   a cylindrical piston guide member configured to guide a vertical movement of the piston member, the cylindrical piston guide member enclosing an outer circumference of the piston member and including
      an opened top,
      an opened bottom, and at least one vertical groove formed on an inner circumference of the cylindrical piston guide member and coupled with the at least one vertical guide of the piston member;
a cylindrical push button including
a top wall,
an opened bottom, and
an insertion projection extending downward from a center of the top wall and enclosing
an outer circumference of the circular projection of the piston member; and
a cylindrical enclosure enclosing an outer circumference of the cylindrical push button and an outer circumference of the piston guide member,
wherein the cylindrical push button is mounted on the cylindrical piston guide member and connected to the piston member via the insertion projection and the circular projection,
wherein, when the piston member rises, the cylinder member is filled with the liquid suctioned from the container via the spuit pipe, and
wherein, when the piston member is descended by pushing the cylindrical push button, the liquid filled in the cylinder member is discharged from the cylinder member.

2. The automatic filling up spuit according to claim 1, wherein the cylinder member includes:
an inner cylinder having a bottom part engaged with the top inner circumference of the spuit pipe;
a horizontal part connected to an outer circumference of a middle part of the inner cylinder;
a cylindrical portion formed on the horizontal part and having an opened bottom;
an inclined groove symmetrically formed on an outer circumference of the cylindrical portion; and
a screw combining portion formed on an inner circumference of the cylindrical portion and configured to be screwed to the entrance of the container.

3. The automatic filling up spuit according to claim 2, wherein
the at least one vertical guide of the piston member includes two vertical guides arranged on opposite sides of the bar-shaped piston,
the at least one vertical groove of the cylindrical piston guide member includes two vertical grooves, and
the piston member further includes a pair of horizontal bars each projecting from a bottom of a corresponding one of the two vertical guides, and received in a corresponding one of the two vertical grooves.

* * * * *